United States Patent
Jensen

(10) Patent No.: US 10,107,429 B2
(45) Date of Patent: Oct. 23, 2018

(54) CONNECTION ASSEMBLY COMPRISING A MOTOR VEHICLE FLUID LINE AND A CONNECTION FITTING

(71) Applicant: TI Automotive (Heidelberg) GmbH, Heidelberg (DE)

(72) Inventor: Hans Jensen, Dettingen unter Teck (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 633 days.

(21) Appl. No.: 13/929,077

(22) Filed: Jun. 27, 2013

(65) Prior Publication Data

US 2014/0001749 A1   Jan. 2, 2014

(30) Foreign Application Priority Data

Jun. 29, 2012 (EP) .................................... 12174464

(51) Int. Cl.
| | |
|---|---|
| *F16L 23/12* | (2006.01) |
| *F16L 19/028* | (2006.01) |
| *B60T 17/04* | (2006.01) |
| *F02M 37/00* | (2006.01) |

(52) U.S. Cl.
CPC .......... *F16L 23/125* (2013.01); *B60T 17/043* (2013.01); *F16L 19/028* (2013.01); *F16L 19/0286* (2013.01); *F02M 37/0017* (2013.01)

(58) Field of Classification Search
CPC ... F16L 19/028; F16L 19/0286; B60T 17/043; F02M 37/0017
See application file for complete search history.

(56) References Cited

U.S. PATENT DOCUMENTS

| | | | | | |
|---|---|---|---|---|---|
| 4,893,657 | A | * | 1/1990 | Usui ..................... | F16L 19/028 138/109 |
| 5,658,025 | A | * | 8/1997 | Ridenour .............. | F16L 19/028 285/334.5 |
| 6,663,146 | B1 | * | 12/2003 | Sakai .................. | F16L 19/0286 285/148.26 |
| 7,600,792 | B2 | * | 10/2009 | Wada .................... | F16L 19/028 285/246 |
| 8,079,621 | B2 | * | 12/2011 | Ferlin ....................... | B21J 5/08 285/353 |
| 8,152,204 | B2 | * | 4/2012 | Pliassounov .......... | F16L 19/028 285/332.1 |

(Continued)

FOREIGN PATENT DOCUMENTS

| | | |
|---|---|---|
| AU | 5398079 A1 | 6/1980 |
| DE | 102 15 169 A1 | 10/2003 |

(Continued)

OTHER PUBLICATIONS

European Patent Office, European Search Report in European Patent Application No. 12174464.3 (dated Dec. 10, 2012).

*Primary Examiner* — James M Hewitt, II
(74) *Attorney, Agent, or Firm* — Brinks Gilson & Lione

(57) ABSTRACT

A connection assembly comprising a motor vehicle fluid line and a connection fitting, wherein the motor vehicle fluid line includes an inner tube made of aluminum. The connection fitting is in contact with the inner tube. At least the surface of the connection fitting is made of aluminum, at least in the region of the contact surface between the connection fitting and the inner tube.

13 Claims, 3 Drawing Sheets

(56) References Cited

U.S. PATENT DOCUMENTS

| | | | |
|---|---|---|---|
| 2009/0224537 A1* | 9/2009 | Pliassounov | B60T 17/04 285/331 |
| 2009/0324363 A1* | 12/2009 | Abbott | F16L 19/0286 411/378 |
| 2011/0169259 A1 | 7/2011 | Schulze | |
| 2011/0204623 A1* | 8/2011 | Weick | F16L 19/0225 285/331 |

FOREIGN PATENT DOCUMENTS

| | | |
|---|---|---|
| EP | 2434190 A2 | 3/2012 |
| EP | 2 474 768 A2 | 7/2012 |
| GB | 346032 | 4/1931 |

\* cited by examiner

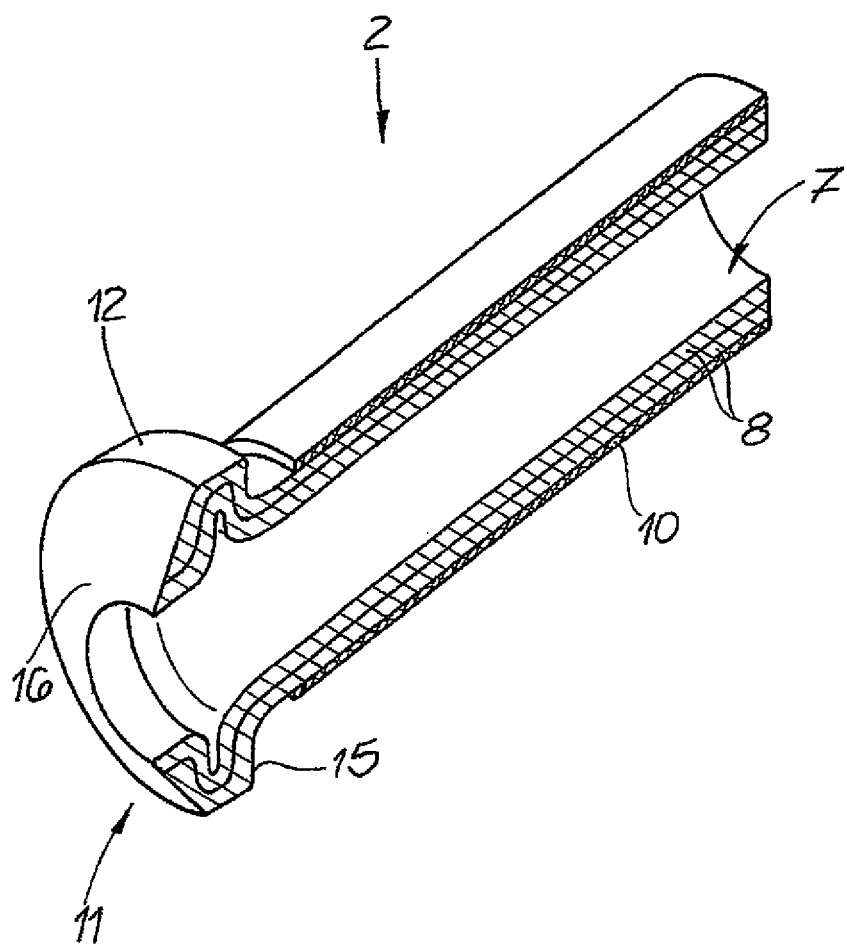

CONNECTION ASSEMBLY COMPRISING A MOTOR VEHICLE FLUID LINE AND A CONNECTION FITTING

CROSS-REFERENCE TO RELATED APPLICATIONS

This patent application claims priority pursuant to Title 35 USC Section 119(e) to European Patent application No. 12 174 464.3 filed Jun. 29, 2012, the entire contents of which are hereby incorporated by reference herein.

BACKGROUND

The invention concerns a connection assembly comprising a motor vehicle fluid line and a connection fitting, wherein the motor vehicle fluid line includes an inner tube. The term motor vehicle fluid line refers to a fluid line for fluids used in motor vehicles. The fluids are, in particular, fuels and hydraulic fluids, such as brake fluid.

Connection assemblies of the type described above are known in practice in different embodiments. As such, a motor vehicle fluid line is known having an inner tube made of steel, and a thin aluminum coating applied to the inner tube. The aluminum coating has a polyamide layer. This motor vehicle fluid line can be connected to connection fittings. With many known connection assemblies of the type specified above, the corrosion resistance leaves a lot to be desired. As such, in particular the connection regions or contact regions between the motor vehicle fluid line and the connection fitting are subject to corrosion, such as from corrosive fluids like water and aqueous salt solutions. It is disadvantageous that many of the known connection assemblies of the type described above do not exhibit sufficient resistance to mechanical effects in the long term.

SUMMARY OF DISCLOSURE

Accordingly, the invention addresses the technical problem of providing a connection assembly of the type described in the introduction, in which the disadvantages described above can be prevented.

To resolve this problem, the invention teaches of a connection assembly for a motor vehicle fluid line and a connection fitting, wherein the motor vehicle fluid line includes an inner tube made of aluminum, wherein the connection fitting is in contact with the aluminum inner tube, and wherein in at least the surface of the connection fitting, at least in the region of the contact surface, or the contact surfaces, respectively, between the connection fitting and the inner tube is made of aluminum.

As explained above, a motor vehicle fluid line means, in particular, a fluid line for fuels and hydraulic fluids, such as brake fluid. Instead of the term motor vehicle fluid line, in the following the abbreviated term "fluid line" shall be used. It is within the scope of the invention that the contact surface, or the contact surfaces, respectively, between the connection fitting and the inner tube aluminum surfaces, of the inner tube on one hand, and the connection fitting on the other hand, are in contact with, or touch, one another.

According to a particularly preferred embodiment of the invention, the inner tube of the fluid line is a double rolled tube. It is within the scope of the invention that in the production of a double rolled tube of this type, an aluminum strip is rolled to the dimensions of the tube, thus resulting in two layers, or aluminum layers, rolled onto one another. Preferably, the surfaces of the layers, or aluminum layers, respectively, are soldered to one another. For this purpose, a soldering substance is disposed on one of the surfaces of the aluminum strip. According to another embodiment of the invention, the inner tube of the fluid line is a single rolled tube. It is within the scope of the invention that in the production of a single rolled tube of this type, an aluminum strip is rolled according to the dimensions of the tube, such that the tube wall consists of only one layer, or aluminum layer, respectively. For this purpose, the longitudinal edges of this rolled aluminum strip are welded together, such that, preferably, a tube is obtained that is butt-welded along a longitudinal seam.

That the inner tube is made of aluminum means, in the scope of the invention, that the inner tube is made of pure aluminum, or is substantially made of pure aluminum, or that the inner tube is made of an aluminum alloy, the main component of which is aluminum. It is the case that, in the scope of the invention, the aluminum alloy includes at least 80% by weight, and preferably 85% by weight, aluminum. According to a particularly preferred embodiment of the invention, the inner tube consists of an aluminum alloy, or substantially consists of an aluminum alloy, respectively, containing at least 90% by weight, aluminum. In particular, in the scope of the invention, the aluminum alloy EN AW 2017 A has been shown to be particularly reliable. This aluminum alloy is also used for the production of aeronautical components. Preferably, the characteristics described above, concerning the pure aluminum or the aluminum alloy, also apply to the connection fitting, or to the surface regions of the connection fitting made of aluminum.

It is recommended that the inner tube of the fluid line is rolled from an aluminum strip, having a thickness of 0.3-0.5 mm, preferably 0.35-0.45 mm. Particularly preferred is a thickness of the aluminum strip of 0.37-0.42 mm. It has been shown to be advantageous that the inner tube includes a thickness of 0.6-1 mm, preferably 0.7-0.9 mm, and particularly preferred is 0.75-0.85 mm.

A recommended embodiment of the invention is characterized in that a plastic coating, in particular a coating made of polyamide, is applied to the outer surface of the inner tube. This plastic coating then forms, preferably, an outer tube, or the outer tube, respectively, of the fluid line. For this purpose, the polyamide that is preferably used is polyamide 12. In the scope of the invention, there is no plastic coating at the contact surfaces between the connection fitting and the inner tube, or, respectively, the plastic coating has been removed here from the inner tube. At this point, there are thus aluminum surfaces in contact with one another without an intermediate plastic coating. Preferably, the thickness of the plastic coating is 35-120 μm, preferably 40-100 μm. According to a particularly preferred embodiment, the thickness of the plastic coating is at least 40 μm.

It is recommended that the fluid line exhibit a flange on at least one fluid line end. It is within the scope of the invention that this flange is an aluminum flange, which is attached or molded to the fluid line, or the inner tube, respectively. For this purpose, a connection fitting of the connection assembly is disposed in the region of the flange, or on the flange of the fluid line, respectively. It is furthermore within the scope of the invention that, in the forming of a flange on a fluid line end of the fluid line, the preferably provided plastic coating is removed in this region. In this manner, an aluminum-aluminum contact can be obtained between regions of the fluid line, or the fluid line end and regions of the connection fitting. For this purpose, the flange is an F-flange or an E-flange.

In a particularly advantageous design of the invention, the connection fitting includes a hole, into which hole the fluid line is inserted, and a front end and/or a stop surface of the connection fitting rests against the flange, or the rear surface of the flange on the fluid line. The hole in the connection fitting is preferably an axial hole extending in the longitudinal axis of the connection fitting. It is within the scope of the invention that at least the front end and/or the stop surface of the connection fitting is made of aluminum, or includes an aluminum coating, respectively. In this respect, in particular, a contact is established between the aluminum surface of the rear end of the flange and the aluminum surface of the front end and/or the stop surface of the connection fitting. It is also fundamentally possible particularly, in addition for an aluminum surface of the hole, or axial hole, respectively, of the connection fitting to be in contact with an aluminum surface of the inner tube. By this means as well, it is possible to establish an aluminum-aluminum contact between the inner tube and the connection fitting.

It is within the scope of the invention that the connection fitting is a threaded fitting, and in particular, a threaded fitting having an outer threading. According to another embodiment, the connection fitting can also be a threaded nut having an inner threading. Fundamentally, the connection fitting can also be a spacing element disposed between two fluid line ends, or, respectively, between two flanges provided on the fluid line ends. For this purpose, the entire surface of the connection fitting is coated with aluminum, or the entire connection fitting consists of aluminum, or substantially of aluminum, respectively.

The invention takes into account the fact that a connection assembly according to the invention is distinguished by an excellent corrosion resistance. This corrosion resistance is provided particularly in the region, or connection region, between the connection fitting and the motor vehicle fluid line, and this being the case even with effects from corrosive substances such as water or aqueous salt solutions over longer periods of time. The use of aluminum for the components of the connection assembly, and in particular for the fluid line, furthermore results in an advantageous weight reduction in comparison with the components known from the prior art. Furthermore, the connection between the connection fitting and the motor vehicle fluid line is also, particularly, distinguished by a surprisingly high mechanical resistance. It should also be noted that a connection assembly according to the invention can be created simply, and with very little expenditure, or at very low cost.

DESCRIPTION OF THE DRAWINGS

In the following, the invention shall be explained in greater detail using drawings depicting a single embodiment example. Shown are, in a schematic depiction.

DETAILED DESCRIPTION OF ILLUSTRATED EMBODIMENT

Figure 1:
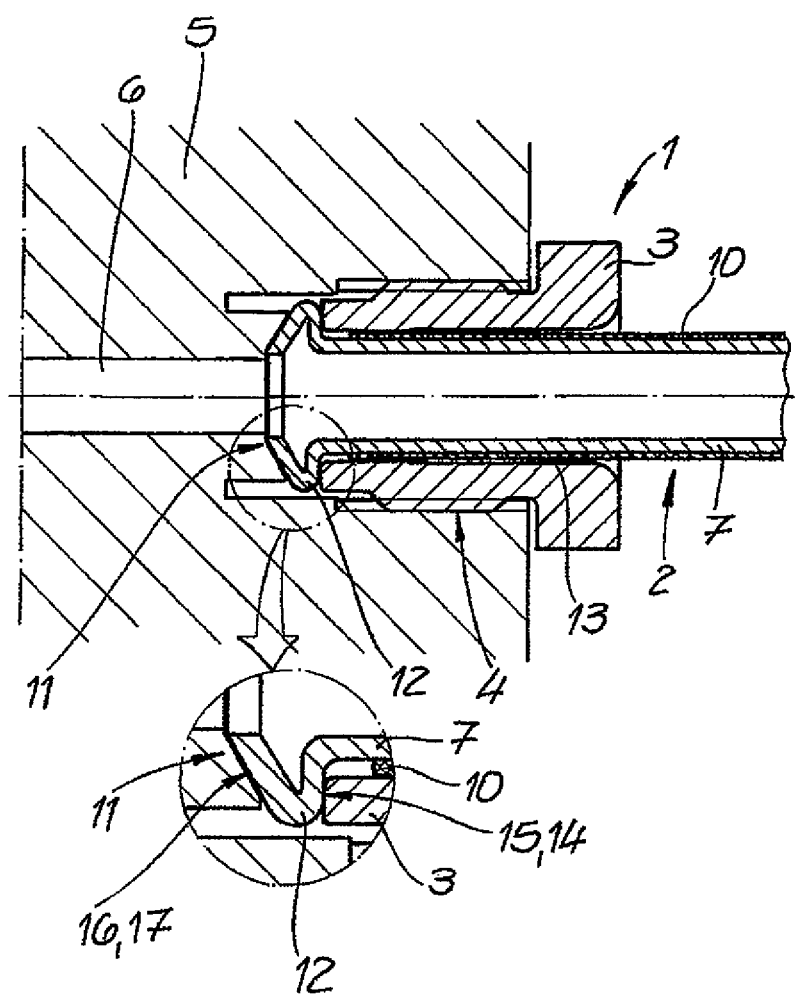
FIG. 1 a view of a connection assembly according to the invention, comprising a motor vehicle fluid line and a connection fitting, FIG. 2 a section cut through the motor vehicle fluid line of the connection assembly according to the invention, and FIG. 3 a perspective view of the motor vehicle fluid line.

FIG. 1 shows a connection assembly 1 according to the invention comprising a motor vehicle fluid line 2 and a connection fitting, wherein the connection fitting is preferably, and in the embodiment example, designed as a threaded fitting 3 having an outer threading 4. The threaded fitting 3 in the embodiment example according to FIG. 1 is threaded into a connection component designed as an connection block 5. The connection block 5 includes an integrated second fluid line 6 in the embodiment example.

Figure 2:
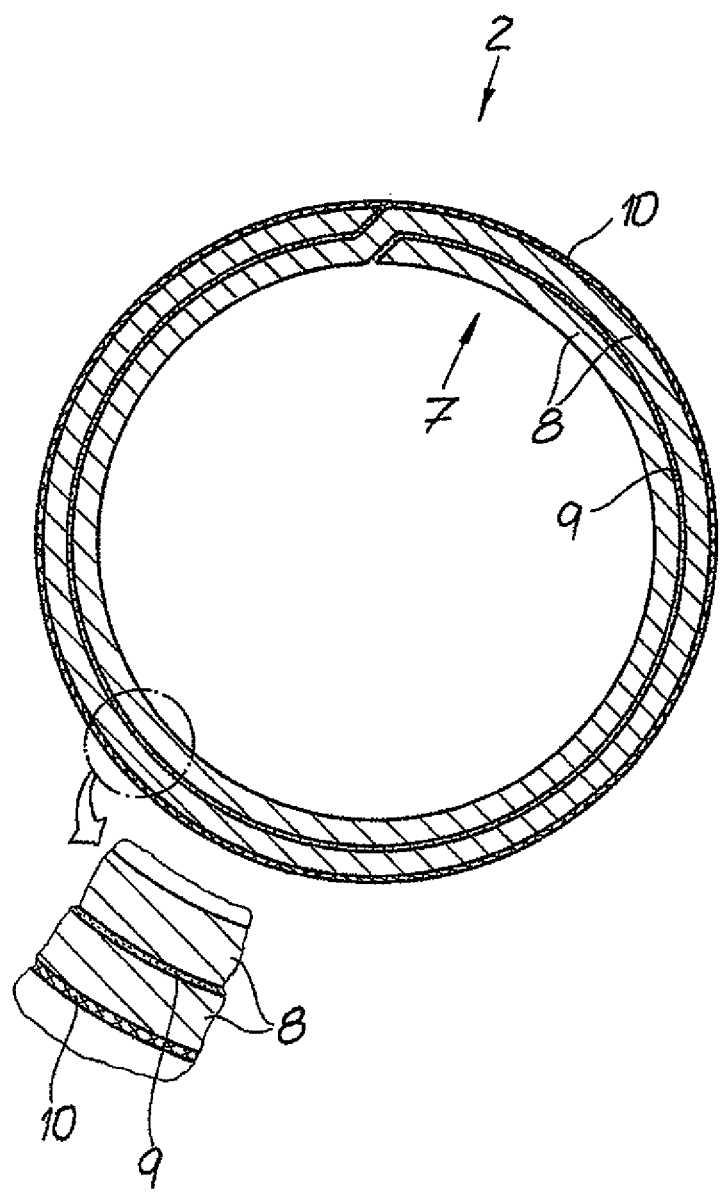

According to the invention, the motor vehicle fluid line 2 includes an inner tube 7 made of aluminum. Preferably, and in the embodiment example, the inner tube 7 is a double rolled tube made of aluminum. For the production of the inner tube 7, an aluminum strip 8 is rolled such that two layers, or aluminum layers are disposed concentrically in the finished inner tube (see, in particular, FIG. 2). For this purpose, the two opposing surfaces of the aluminum layers are soldered together, or soldered around one another, using a soldering substance 9. The thickness of the aluminum strip 8 amounts to 0.395 mm in the embodiment example.

Preferably, and in the embodiment example, a plastic coating 10 is applied to the outer surface of the inner tube 7. It is recommended that this plastic coating consist of a polyamide, and it is particularly preferred that it consist of polyamide 12. The thickness of the plastic coating 10 amounts to 70 μm in the embodiment example.

The motor vehicle fluid line 2 includes a flange 12 on its fluid line end 11, which is designed as an F-flange in the embodiment example. The flange 12 is formed on the motor vehicle fluid line 2, or the inner tube 7, respectively, and thus also consists of aluminum. The outer plastic coating 10 of the motor vehicle fluid line 2 is removed in the region of the flange 12, such that the aluminum surface is exposed here.

The connection fitting, designed as a threaded fitting 3, makes contact with the aluminum inner tube 7 at the flange 12. Preferably, and in the embodiment example, the connection fitting, or threaded fitting 3, respectively, is made of aluminum. The threaded fitting 3 includes an axial hole 13, into which the motor vehicle fluid line 2 is inserted. The front end 14 of the threaded fitting 3 rests against the flange 12, or the rear surface 15 of the flange 12. A contact surface, or contact surfaces, respectively, form a direct contact here between the threaded fitting 3 and the inner tube 7, such that the aluminum surfaces of the threaded fitting 3 and the inner tube 7 lie directly against one another. The threaded fitting 3 furthermore presses the flange 12 at its front end sealing surface 16 against a connection surface 17 of the connection block 5.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A connection assembly for hydraulic fluids comprising a motor vehicle fluid line, a connection component, and a connection fitting, wherein said motor vehicle fluid line includes an inner tube and a plastic coating, the inner tube consisting of pure aluminum or an aluminum alloy of which aluminum is the main component, and said connection fitting is in direct contact with said inner tube, wherein, at least a surface of said connection fitting consists of aluminum, at least in a region of contact between said connection fitting and said inner tube;

wherein the plastic coating is located on an outer surface of the inner tube, such that no plastic coating resides in the region of contact between the connection fitting and the inner tube;

wherein said inner tube is a single or double rolled tube;

wherein said fluid line includes an F-flange or an E-flange on at least one end thereof;

wherein the region of contact comprises a ring-shaped contact surface;

wherein the flange comprises a conical sealing surface for sealing off the inner tube together with a complementary conical sealing surface of the connection component;

characterized in that aluminum-aluminum contact occurs in the region of contact between the inner tube and the connection fitting, wherein the outer surface of the inner tube is cylindrical so that the radius of the outer surface is constant around a whole turn.

2. The connection assembly according to claim 1, wherein said inner tube is a double rolled tube.

3. The connection assembly according to claim 2, wherein said inner tube is rolled from an aluminum strip having a thickness of 0.3-0.5 mm.

4. The connection assembly according to claim 3, wherein the aluminum strip has a thickness between 0.35-0.45 mm.

5. The connection assembly according to claim 1, wherein said inner tube is a single rolled tube.

6. The connection assembly according to claim 1, wherein said inner tube is made of an aluminum alloy containing at least 90% by weight aluminum.

7. The connection assembly according to claim 1, wherein the plastic coating applied to an outer surface of said inner tube is a polyimide.

8. The connection assembly according to claim 7, wherein said thickness of said plastic coating is 35-120 µm.

9. The connection assembly according to claim 1, wherein said connection fitting includes a hole, into which hole said fluid line is inserted, and wherein a front end of said connection fitting defines a stop surface which rests against said flange of the fluid line.

10. The connection assembly according to claim 9, wherein at least said front end of said connection fitting is made of aluminum, or includes an aluminum coating.

11. The connection assembly according to claim 1, wherein said connection fitting is a threaded fitting.

12. The connection assembly according to claim 11, wherein said threaded fitting has an outer threading.

13. The connection assembly according to claim 1, wherein said entire surface of said connection fitting is coated with aluminum, or wherein said entire connection fitting is made of, or is substantially made of, aluminum.

* * * * *